US011380477B2

(12) United States Patent
Gholami et al.

(10) Patent No.: US 11,380,477 B2
(45) Date of Patent: Jul. 5, 2022

(54) DOUBLE WALL SOUND SHIELD WITH MODULAR SOUND ABSORBENT PANELS FOR AN AIR CORE REACTOR

(71) Applicant: Trench Limited, Scarborough (CA)

(72) Inventors: Mohammad Sadegh Gholami, Richmon Hill (CA); Sean Alves, Ajax (CA)

(73) Assignee: TRENCH LIMITED, Scarborough (CA)

( * ) Notice: Subject to any disclaimer, the term of this patent is extended or adjusted under 35 U.S.C. 154(b) by 744 days.

(21) Appl. No.: 16/390,122

(22) Filed: Apr. 22, 2019

(65) Prior Publication Data

US 2020/0335268 A1    Oct. 22, 2020

(51) Int. Cl.
| | |
|---|---|
| *H01F 27/33* | (2006.01) |
| *G10K 11/00* | (2006.01) |
| *H01F 5/02* | (2006.01) |
| *G10K 11/18* | (2006.01) |
| *H01F 27/06* | (2006.01) |

(52) U.S. Cl.
CPC .......... *H01F 27/33* (2013.01); *G10K 11/002* (2013.01); *G10K 11/18* (2013.01); *H01F 5/02* (2013.01); *H01F 27/06* (2013.01)

(58) Field of Classification Search
None
See application file for complete search history.

(56) References Cited

U.S. PATENT DOCUMENTS

| | | |
|---|---|---|
| 2016/0104568 A1 | 4/2016 | Best et al. |
| 2019/0006091 A1 | 1/2019 | Salubro et al. |

FOREIGN PATENT DOCUMENTS

| | | |
|---|---|---|
| AT | 520050 A1 | 12/2018 |
| CN | 201478084 U | 5/2010 |
| DE | 1185832 B | 1/1965 |

OTHER PUBLICATIONS

PCT International Search Report and Written Opinion dated Jul. 28, 2020 corresponding to PCT Application No. PCT/US2020/026985 filed Apr. 7, 2020.

*Primary Examiner* — Kenny H Truong

(57) ABSTRACT

An air core dry type power reactor comprises upper and lower spider units and a coil including a plurality of cylindrically shaped winding layers including an outermost layer. The reactor further comprises a double wall sound shield including concentric a first roving cylinder and a second roving cylinder, the first roving cylinder positioned against the outermost layer but detached from the coil by a first airgap between the outermost layer and the first roving cylinder to reduce a structure-borne transmission of an acoustic energy or attached by ductsticks to the coil. The second roving cylinder is placed at a distance from the first roving cylinder to form an acoustic cavity between two double walls of the first roving cylinder and the second roving cylinder. The double wall sound shield further including a plurality of sound absorbent panels to attenuate resonances of the acoustic cavity between the two double walls of the first roving cylinder and the second roving cylinder. The plurality of sound absorbent panels comprises a layer of sound absorbing material and each of the plurality of sound absorbent panels is separated from the first roving cylinder by a second airgap.

20 Claims, 7 Drawing Sheets

View A-A'

DOUBLE WALL SOUND SHIELD WITH MODULAR SOUND ABSORBENT PANELS FOR AN AIR CORE REACTOR

BACKGROUND

1. Field

Aspects of the present invention generally relate to a double wall sound shield with modular sound absorbent panels for an air core reactor.

2. Description of the Related Art

Competitive market and environmental concerns have placed a drastic demand on reactor manufacturers to design less noisy coils. However, designing a silent coil has its own limitations. Therefore, the only possible solution is to control propagation of the sound generated in a reactor.

The following methods have been used so far to attenuate noise generated within an air-core reactor:

(a) Low Force Package:
  The low force package is an external winding package which carries lower current and it is semi-decoupled from the rest of packages.
(b) Stand-Alone Sound Shields (Also Known as Zero-Force Package):
  These kinds of sound shields are manufactured as an outermost fiberglass packages or cylinders. The zero force packages don't have acoustic lining or current. They are manufactured by hand-lay up or wet roving technology in a uniform or a modular format.
(c) Acoustic Absorption Package:
  They are an external fiberglass package lined with acoustic absorption materials (e.g. mineral wool, fiberglass, etc.). The method is based on the sound absorption of the sound generated within an air-core reactor. Three types of the integrated sound shields have been developed at Trench limited so far: the first model is secured to the outermost surface of a reactor by means of friction. In the second type, the friction was eliminated. It is worth mentioning that the attenuation mechanism in both designs is based on sound absorption of the absorbent materials. In addition, there are other sound shields based on single wall isolation and the absorption concept that are used. However, still better solutions based on enhancement in sound transmission loss (STL) are needed to attenuate noise generated within an air-core reactor.

Therefore, there is a need of a better sound shield system to attenuate noise generated within an air-core reactor.

SUMMARY

Briefly described, aspects of the present invention relate to a sound shield system based on enhancement in sound transmission loss (STL) using a concentric double-cylinders and sound attenuation panels decoupled from cylinders by air gaps. The proposed solution is based on increasing the sound transmission loss (STL) in the sound shield system. Therefore, less acoustic power is transmitted to a receiving side by using double concentric cylinders (double walls) and the resonances of an acoustic cavity between two double walls are attenuated using modular sound absorbent panels.

In accordance with one illustrative embodiment of the present invention, an air core dry type power reactor is provided. The reactor comprises upper and lower spider units each comprising a plurality of support arms extending radially outward from a central axis. The reactor further comprises a coil including a plurality of cylindrically shaped winding layers concentrically positioned about one another and with respect to the central axis, the plurality of cylindrically shaped winding layers including an outermost layer. The reactor further comprises a double wall sound shield including concentric a first roving cylinder and a second roving cylinder, the first roving cylinder positioned against the outermost layer but detached from the coil by a first airgap between the outermost layer and the first roving cylinder to reduce a structure-borne transmission of an acoustic energy or attached by ductsticks to the coil. The second roving cylinder is placed at a distance from the first roving cylinder to form an acoustic cavity between two double walls of the first roving cylinder and the second roving cylinder. The double wall sound shield further includes a plurality of sound absorbent panels to attenuate resonances of the acoustic cavity between the two double walls of the first roving cylinder and the second roving cylinder. The plurality of sound absorbent panels comprises a layer of sound absorbing material and each of the plurality of sound absorbent panels is separated from the first roving cylinder by a second airgap.

In accordance with another illustrative embodiment of the present invention, a method of attenuating noise generated within an air-core reactor. The method comprises providing upper and lower spider units each comprising a plurality of support arms extending radially outward from a central axis. The method further includes providing a coil including a plurality of cylindrically shaped winding layers concentrically positioned about one another and with respect to the central axis, the plurality of cylindrically shaped winding layers including an outermost layer. The method further includes providing a double wall sound shield including concentric a first roving cylinder and a second roving cylinder, the first roving cylinder positioned against the outermost layer but detached from the coil by a first airgap between the outermost layer and the first roving cylinder to reduce a structure-borne transmission of an acoustic energy or attached by ductsticks to the coil. The second roving cylinder is placed at a distance from the first roving cylinder to form an acoustic cavity between two double walls of the first roving cylinder and the second roving cylinder. The double wall sound shield further includes a plurality of sound absorbent panels to attenuate resonances of the acoustic cavity between the two double walls of the first roving cylinder and the second roving cylinder. The plurality of sound absorbent panels comprises a layer of sound absorbing material and each of the plurality of sound absorbent panels is separated from the first roving cylinder by a second airgap.

DETAILED DESCRIPTION

Figure 1:
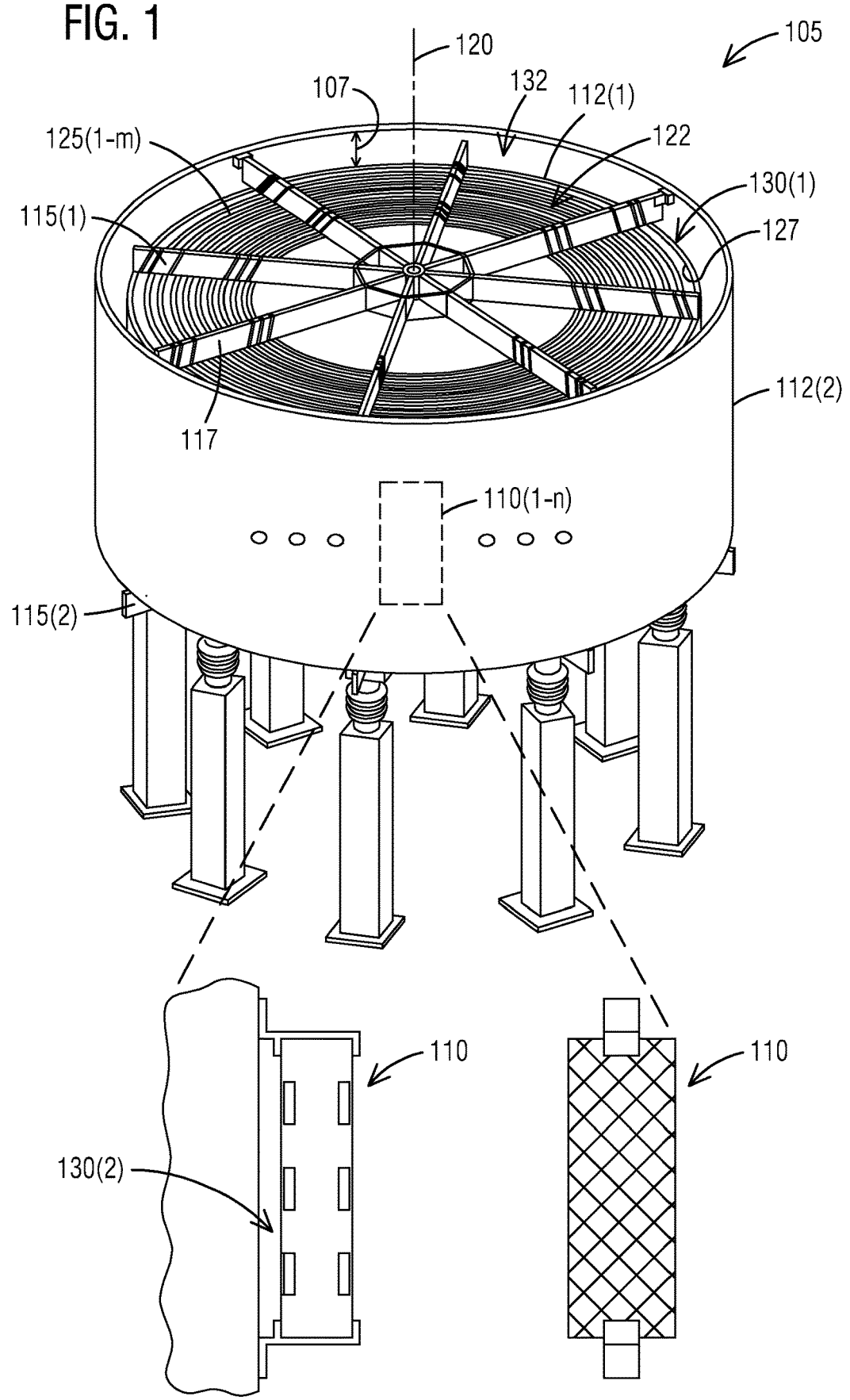
FIG. 1 illustrates a diagrammatic view of an air core dry type power reactor including a double wall sound shield with a plurality of modular sound absorbent panels sandwiched between double walls of two cylinders in accordance with an exemplary embodiment of the present invention.

To facilitate an understanding of embodiments, principles, and features of the present invention, they are explained hereinafter with reference to implementation in illustrative embodiments. In particular, they are described in the context of a double wall system that is detached from a coil by an airgap between an outermost winding package and a first roving cylinder. This reduces the structure-borne transmission of the acoustic energy. Then, a second roving cylinder is placed at a definite distance from the first roving cylinder. Next, the resonances of an acoustic cavity between two double walls are attenuated using a plurality of modular sound absorbent panels. The modular sound absorbent panels are sandwiched between mesh-grid fiberglass sheets to increase the sound absorption in the acoustic cavity and also increase the bending resistivity of the panels. However, the sound panels are separated from the first roving cylinder by an airgap that results in better sound absorption and improves curing process of the fiberglass cylinder. To increase the absorption surface and reduce impedance mismatch between air and an absorbent layer, the surface of the absorbent materials has been made in a step-shape. The absorbent panels fill up to a definite percentage of the space between concentric cylinders which is defined based on the frequency range of a reactor and volume. Therefore, considerable material savings and weight reduction compared to previous models is achieved. The dimensions of sound panels are fixed for coils with various dimensions. Therefore, standardizing the size and changing the configuration results into considerable reduction in manufacturing cost. In addition, installation of sound panels is easier than common sound panels that results in labor hours saving during sound shield installation. The number of sound panel rows along an axis is defined based on a distance between upper and lower spiders (DBS) of the coil. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the double wall sound shield with modular sound absorbent panels for an air core reactor according to the present disclosure are described below with reference to FIGS. 1-10 herein. Like reference numerals used in the drawings identify similar or identical elements throughout the several views. The drawings are not necessarily drawn to scale.

Consistent with one embodiment of the present invention, FIG. 1 represents a representation of a diagrammatic view of an air core dry type power reactor 105 including a double wall sound shield 107 with a plurality of modular sound absorbent panels 110(1-$n$) sandwiched between double walls of first and second roving cylinders 112(1, 2) in accordance with an exemplary embodiment of the present invention. A system is based on increasing transmission loss by using double concentric cylinders 112 and attenuating of the resonance of an acoustic cavity located between the two cylinders 112. Therefore, less acoustic power will be transmitted to the receiving side by using double concentric cylinders 112 (a double wall concept) and the resonances of the acoustic cavity between two double walls are attenuated using the sound absorbent panels 110.

The air core dry type power reactor 105 further comprises upper and lower spider units 115(1, 2) each comprising a plurality of support arms 117 extending radially outward from a central axis 120. The air core dry type power reactor 105 further comprises a coil 122 including a plurality of cylindrically shaped winding layers 125(1-$m$) concentrically positioned about one another and with respect to the central axis 120. The plurality of cylindrically shaped winding layers 125(1-$m$) including an outermost layer 127. The first roving cylinder 112(1) can be either attached to the coil 122 by ductsticks or completely detached from the coil 122.

The double wall sound shield 107 includes concentric the first roving cylinder 112(1) and the second roving cylinder 112(2). The first roving cylinder 112(1) is positioned against the outermost layer 127 but detached from the coil 122 by a first airgap 130(1) between the outermost layer 127 and the first roving cylinder 112(1) to reduce a structure-borne transmission of an acoustic energy. The second roving cylinder 112(2) is placed at a distance from the first roving cylinder 112(1) to form an acoustic cavity 132 between two double walls of the first roving cylinder 112(1) and the second roving cylinder 112(2). The double wall sound shield 107 further including the plurality of modular sound absorbent panels 110(1-$n$) to attenuate resonances of the acoustic cavity 132 between the two double walls of the first roving cylinder 112(1) and the second roving cylinder 112(2). The plurality of modular sound absorbent panels 110(1-$n$) comprises a layer of sound absorbing material and each of the plurality of sound absorbent panels 110 is separated from the first roving cylinder 112(1) by a second airgap 130(2) (see in the side view and a front view of the sound panel 110 as shown in FIG. 1).

The double wall sound shield 107 is configured to increase a transmission loss such that less acoustic power will be transmitted to a receiving side by using double concentric walls of the first roving cylinder 112(1) and the second roving cylinder 112(2). The double wall sound shield 107 is configured to control propagation of sound generated in the reactor 105 to attenuate noise generated within the reactor 105 with a combination of a sound shield structure 107 that enhances sound transmission loss (STL) using a concentric double cylinder structure 112 and a sound attenuation panel structure 110 decoupled from the concentric double cylinder structure 112 by air gaps 130. The double wall sound shield 107 including double absorbent surface and the plurality of sound absorbent panels 110 being modular sound panels.

Figure 2:
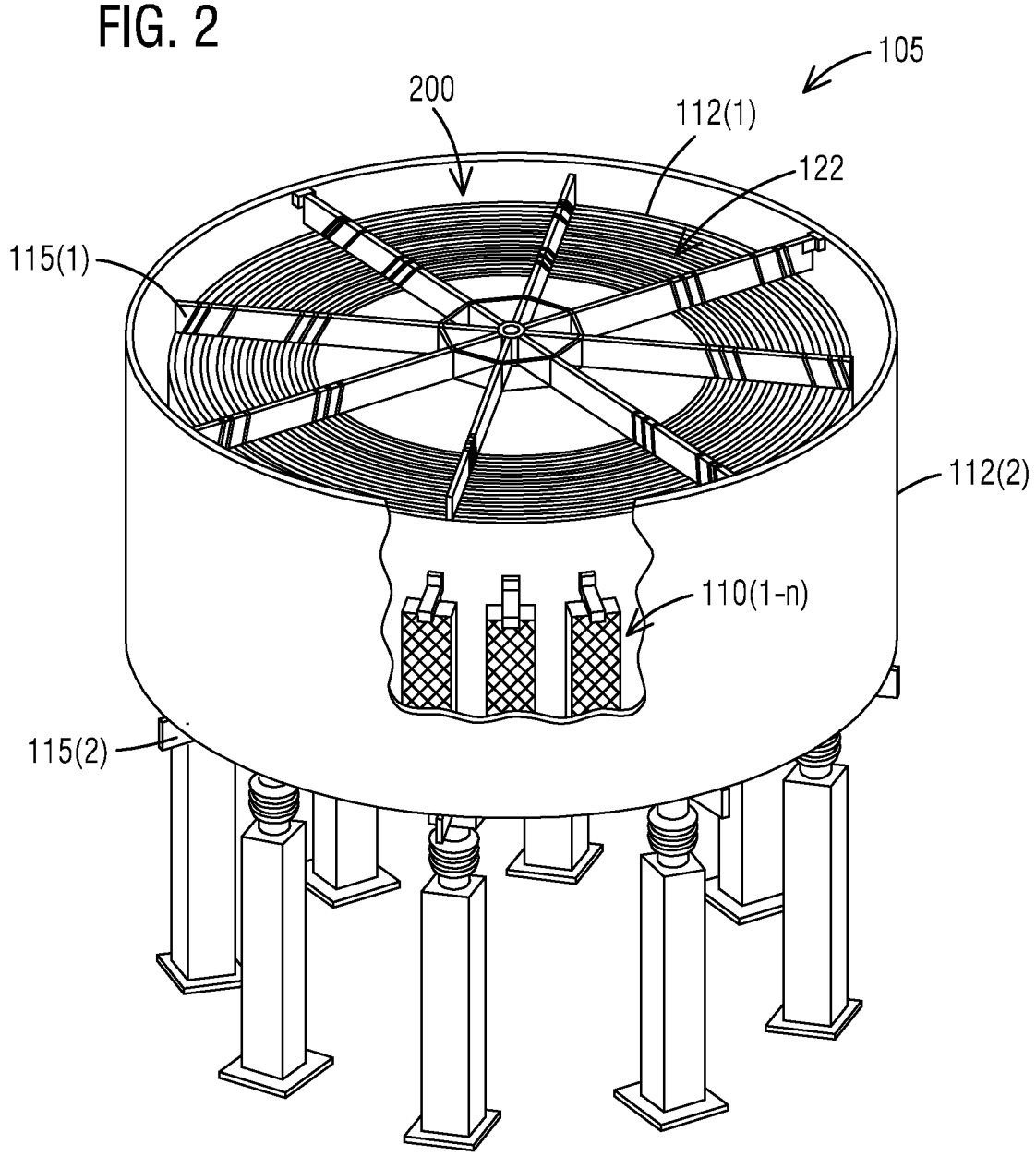
FIG. 2 illustrates a cutout view of the plurality of modular sound absorbent panels that are placed between a double wall system to dissipate the double wall resonance in accordance with an exemplary embodiment of the present invention.

Referring to FIG. 2, it illustrates a cutout view of the plurality of modular sound absorbent panels 110(1-n) that are placed between a double wall system 200 to dissipate the double wall resonance in accordance with an exemplary embodiment of the present invention. The present invention introduces the double wall system 200 based on enhancement in sound transmission loss (STL) using concentric double-cylinders 112 and the sound attenuation panels 110 decoupled from the cylinders 112 by an air-gap concept to control propagation of the sound generated in the reactor 105.

The plurality of sound absorbent panels 110 are modular and standardized such that dimensions of the plurality of sound absorbent panels 110 are sized regardless of dimensions of the coil 122. In other words, the plurality of sound absorbent panels 110 have a standard size for all type of reactors. This property results in manufacturing cost reduction. The double wall system 200 achieves considerable material savings. Reduction of weight lets one to eliminate the vertical sticks in previous designs. Changing the functionality of sound panels from sound absorption panels 110 to the double wall sound barriers results in elimination of structural epoxy resin fiberglass mesh and fiberglass ties. Reducing the weight of sound shield results saving in other supporting structures. Mass reduction and uniform size for panels result in reduction in production cost of the plurality of sound absorbent panels 110.

Figure 3:
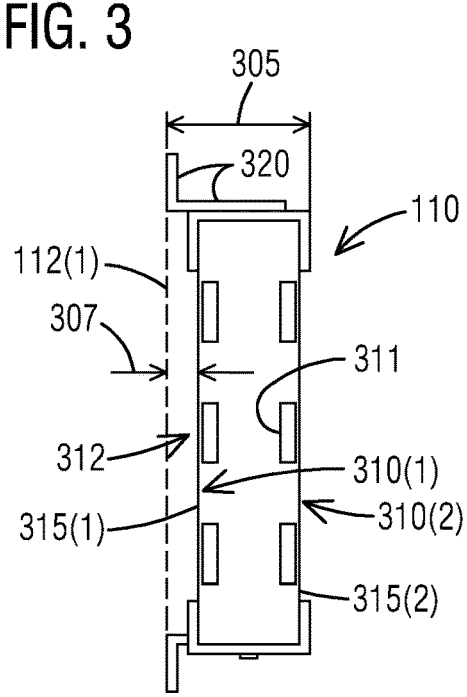
FIG. 3 illustrates a side view of a modular sound absorbent panel used to increase sound absorption in accordance with an exemplary embodiment of the present invention.

Turning now to FIG. 3, it illustrates a side view of a modular sound absorbent panel 110 used to increase sound absorption in accordance with an exemplary embodiment of the present invention. The modular sound absorbent panel 110 includes a width dimension 305 extending along a radial direction with respect to the central axis 120 (see FIG. 1) to provide a separation distance 307 between the first roving cylinder 112(1) and the modular sound absorbent panel 110 such that the separation distance 307 defines a acoustic cavity 312. The modular sound absorbent panel 110 has two opposing major surfaces 310(1, 2) that form an absorbent layer of absorbent materials such that each of the two opposing major surfaces has a step-shape surface 311 to increase an absorption surface and reduce impedance mismatch between air and the absorbent layer. The modular sound absorbent panel 110 is sandwiched between two mesh-grid fiberglass sheets 315(1, 2) to increase the sound absorption in the acoustic cavity 312 and also increase the bending resistivity of the panel 110.

The modular sound absorbent panel 110 comprises installation means 320 such that an installation labor hour saving associated with installation of the modular sound absorbent panel 110 during the double wall sound shield installation is better than installing of common known sound panels. The plurality of sound absorbent panels 110 comprises production and the installation means 320 such that standard sound panels eliminates custom designing that results in lower production cost. In addition, installation of these panels 110, because of their size and weight, can be performed by one operator and is faster than common known sound panels.

Figure 4:
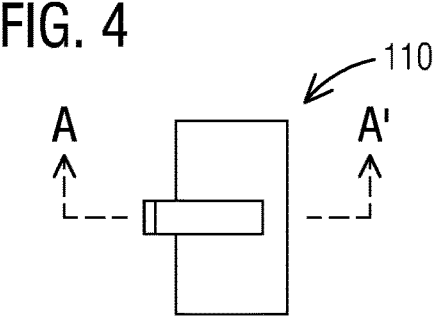
FIG. 4 illustrates a top view of the modular sound absorbent panel of FIG. 3 in accordance with an exemplary embodiment of the present invention.
Figure 5:
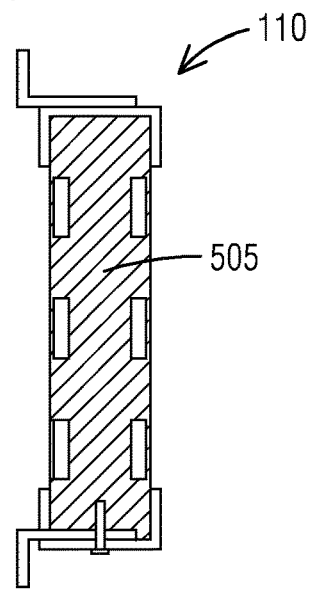
FIG. 5 illustrates a cross-sectional view of the modular sound absorbent panel of FIG. 4 at a line A-A' in accordance with an exemplary embodiment of the present invention.

The plurality of sound absorbent panels 110(1-n) fill up a percentage of the space between concentric the first roving cylinder 112(1) and the second roving cylinder 112(2) such that the percentage of the space filled is defined based on a frequency range and a volume of the air core dry type power reactor 105.

$$Np = \left\lceil \frac{(OD + 2 \text{ in})\pi}{5 \times n_f} \right\rceil,$$

$$n_f = \begin{cases} 2 & f_{MaxSPL} \leq 1400 \text{ Hz} \\ 3 & f_{MaxSPL} \geq 1400 \text{ Hz} \end{cases}$$

where
Np: Number of sound panels per row
OD: outermost diameter of a reactor
$f_{MaxSPL}$: Mechanical frequency associated to the maximum sound pressure level
$n_f$=constant based on frequency FIG. 4 illustrates a top view of the modular sound absorbent panel 110 of FIG. 3 in accordance with an exemplary embodiment of the present invention. As seen in FIG. 5, it illustrates a cross-sectional view of the modular sound absorbent panel 110 of FIG. 4 at a line A-A' in accordance with an exemplary embodiment of the present invention. The modular sound absorbent panel 110 comprises a layer of sound absorbing material 505. The modular sound absorbent panel 110 may be an external fiberglass package lined with acoustic absorption materials (e.g. mineral wool, fiberglass etc.). The attenuation mechanism is based on sound absorption of the absorbent materials using innovative sound absorbent panels.

Figure 6:
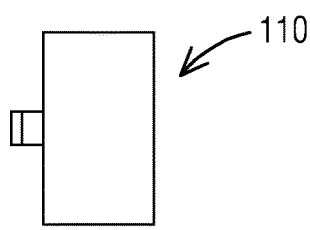
FIG. 6 illustrates a bottom view of the modular sound absorbent panel of FIG. 3 in accordance with an exemplary embodiment of the present invention.
Figure 7:
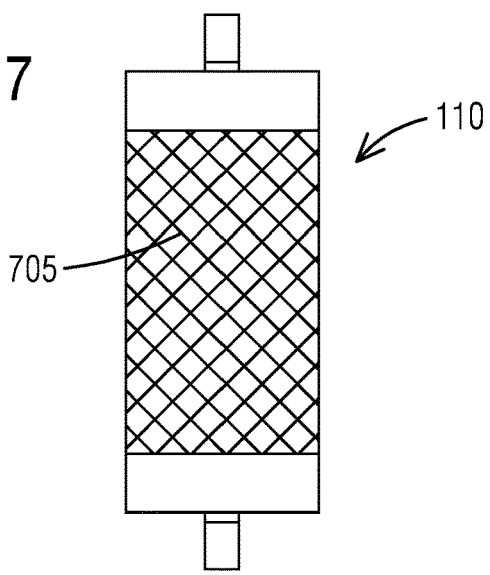
FIG. 7 illustrates a front view of the modular sound absorbent panel of FIG. 3 with a front mesh in accordance with an exemplary embodiment of the present invention.

As shown in FIG. 6, it illustrates a bottom view of the modular sound absorbent panel 110 of FIG. 3 in accordance with an exemplary embodiment of the present invention. In FIG. 7, it illustrates a front view of the modular sound absorbent panel 110 of FIG. 3 with a front mesh 705 in accordance with an exemplary embodiment of the present invention. For example, the modular sound absorbent panel 110 is sandwiched between two mesh-grid fiberglass sheets to increase the sound absorption in the acoustic cavity 312 and also increase the bending resistivity of the panel 110. A mesh on outer and inner surfaces of the panel 110 is used to increase sound dissipation.

Figure 8:
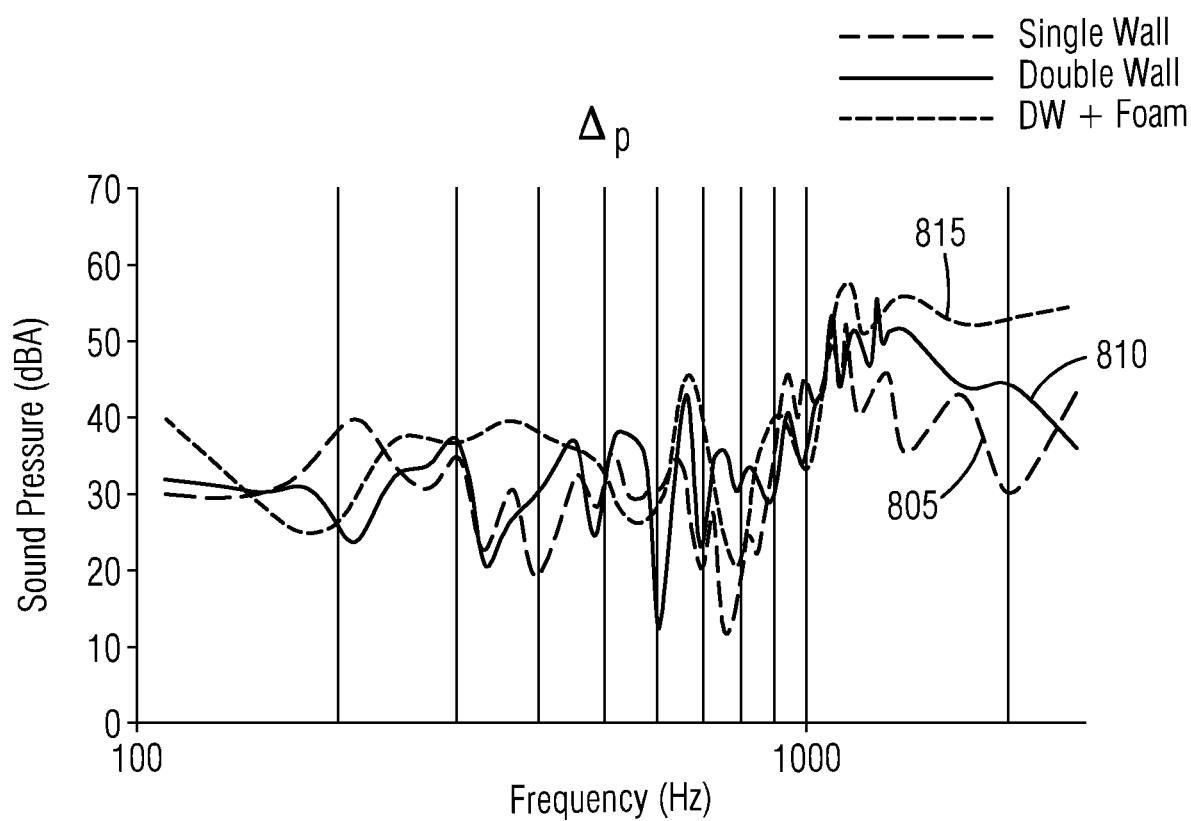
FIG. 8 illustrates a pressure drop when excitation is completely isolated from the receiving side in accordance with an exemplary embodiment of the present invention.

With regard to FIG. 8, it illustrates a pressure drop when excitation is completely isolated from the receiving side in accordance with an exemplary embodiment of the present invention. An impact of using the double wall system 200 instead of a single wall on sound transmission loss is shown in FIG. 8. A single wall curve 805, a double wall curve 810, a double wall plus foam curve 815 (with sound panels 110) are shown.

Figure 9:
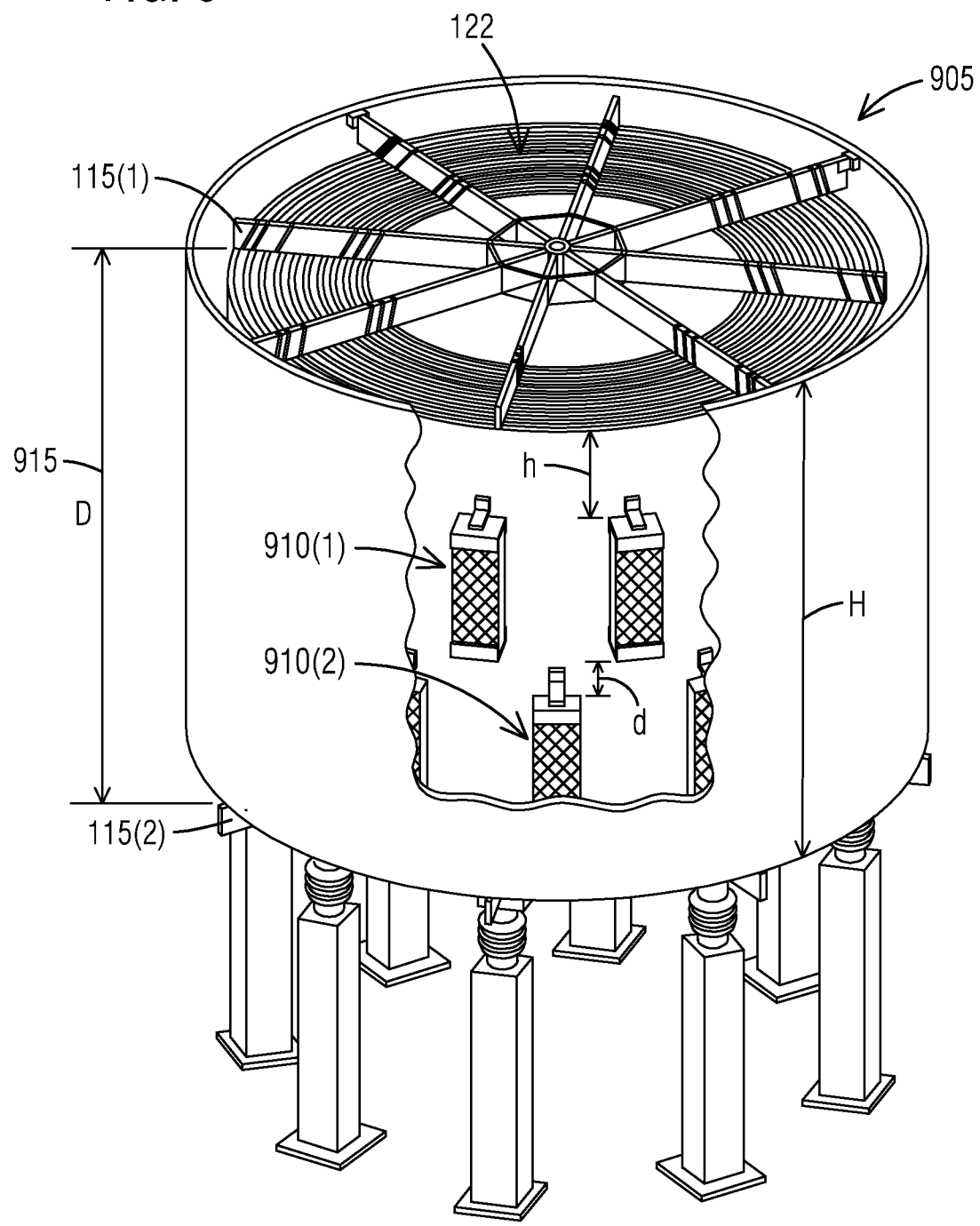
FIG. 9 illustrates a cutout view of an air core dry type power reactor including a double row of modular sound absorbent panels in accordance with an exemplary embodiment of the present invention.

With respect to FIG. 9, it illustrates a cutout view of an air core dry type power reactor 905 including a double row 910(1, 2) of modular sound absorbent panels 110 in accordance with an exemplary embodiment of the present invention. A given number of sound panel rows along an axis being defined based on a distance (D) 915 between the upper and lower spider units 115(1, 2) (DBS) of the coil 122.

$$NR = \begin{cases} 1 & H \leq 60 \text{ (in)} \\ 2 & 60 < H \leq 100 \text{ (in)}, \\ 3 & H > 100 \text{ (in)} \end{cases}$$

where
NR=number of rows of sound panels
H (in): DBS+Spider width
Note: in any case h<20 in, d=2 in.

Figure 10:
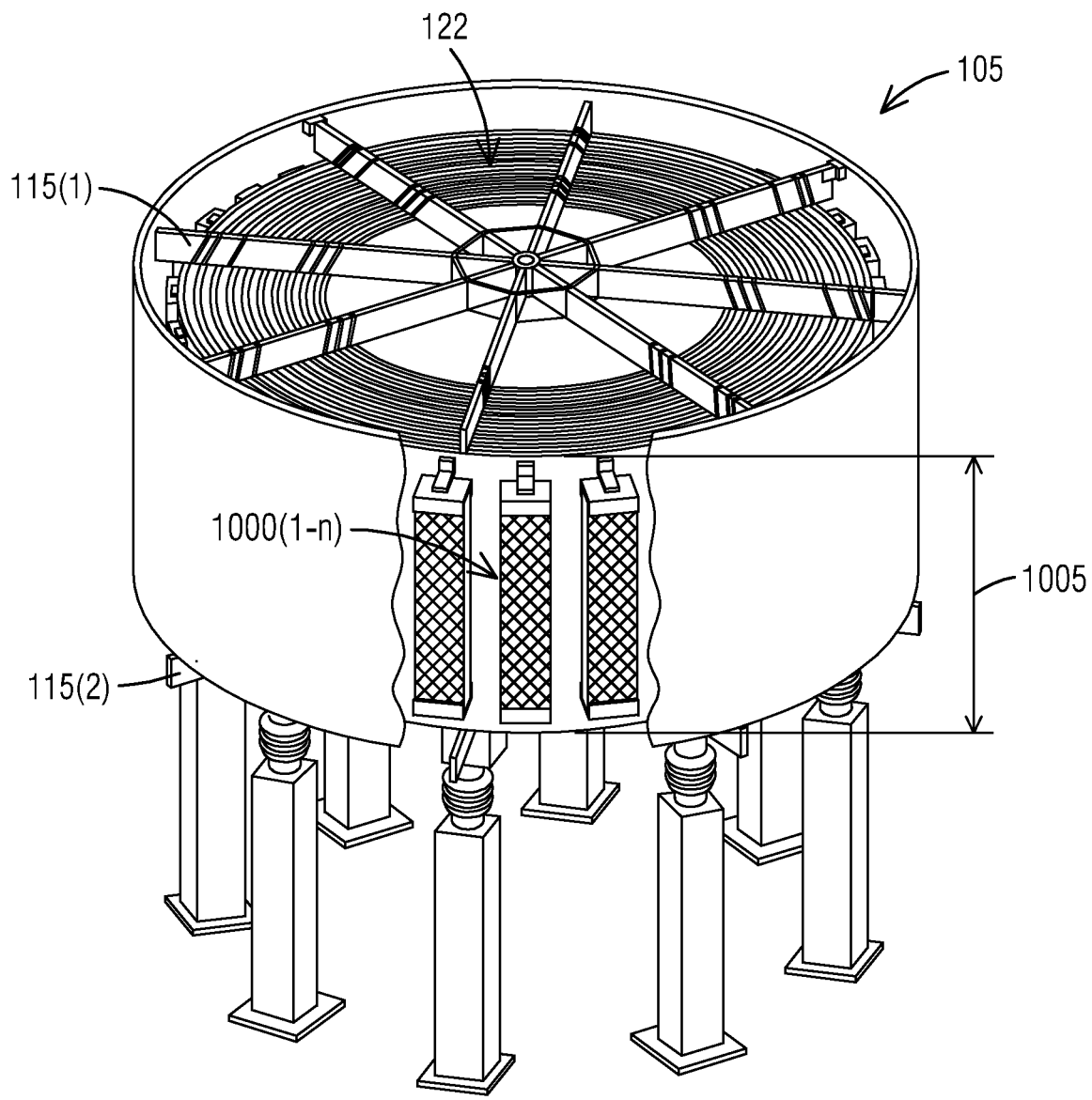
FIG. 10 illustrates a cutout view of a plurality of modular sound absorbent panels in which a length of the sound panels is extended from top to bottom spider units in accordance with an exemplary embodiment of the present invention.

FIG. 10 illustrates a cutout view of a plurality of modular sound absorbent panels 1000(1-n) in which a length 1005 of the sound panels is extended from upper to lower spider units 115(1, 2) in accordance with an exemplary embodiment of the present invention. The length 1005 of the sound panels 1000 can be extended from top to bottom spider units 115(1, 2) for special cases such as high voltage cases.

Figure 11:
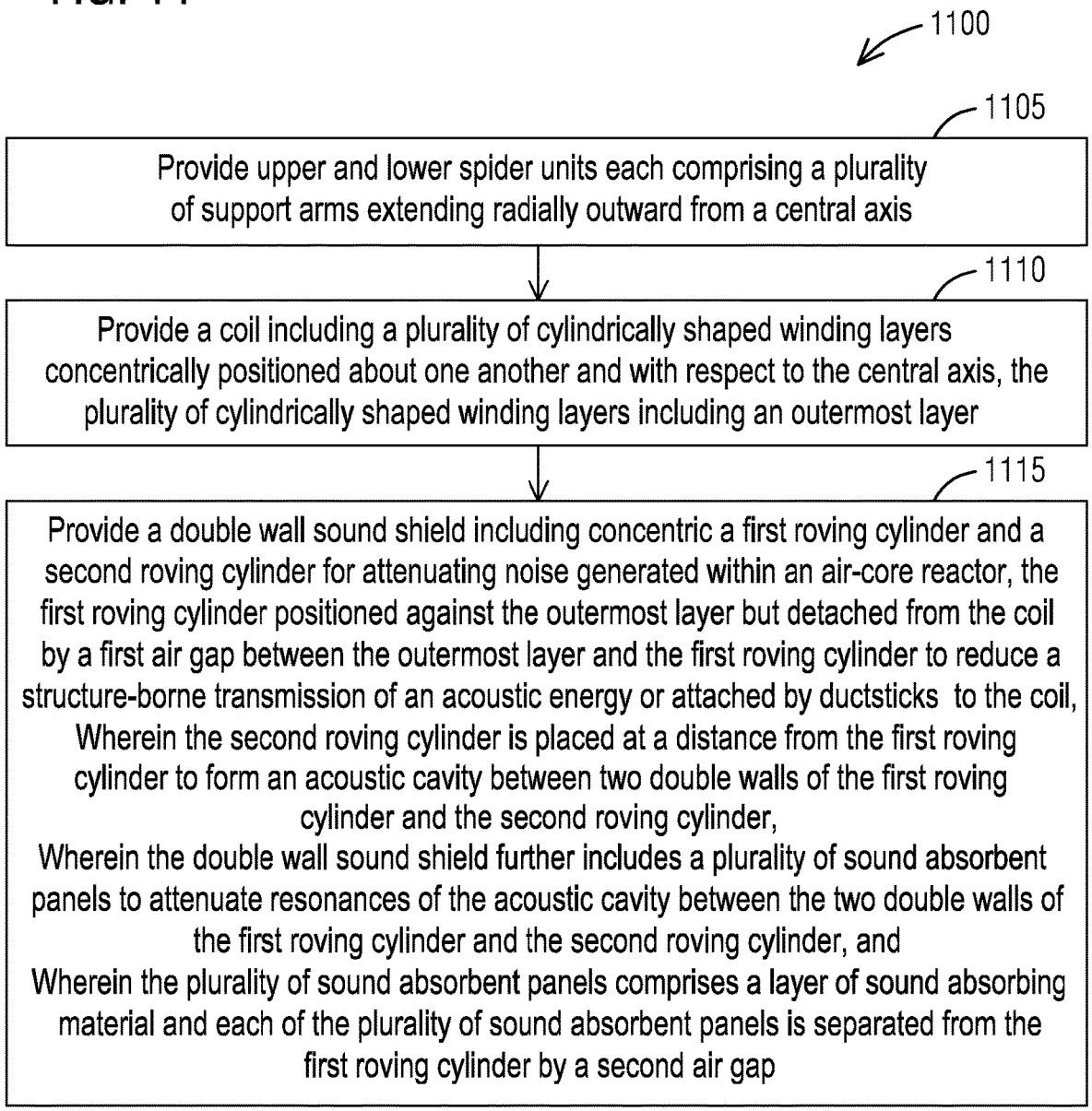
FIG. 11 illustrates a schematic view of a flow chart of a method of attenuating noise generated within an air-core reactor in accordance with an exemplary embodiment of the present invention.

FIG. 11 illustrates a schematic view of a flow chart of a method 1100 of attenuating noise generated within the air-core reactor 105, 905 in accordance with an exemplary embodiment of the present invention. Reference is made to the elements and features described in FIGS. 1-9. It should be appreciated that some steps are not required to be performed in any particular order, and that some steps are optional.

The method 1100 includes a step 1105 of providing upper and lower spider units each comprising a plurality of support arms extending radially outward from a central axis. The method 1100 further includes a step 1110 of providing a coil including a plurality of cylindrically shaped winding layers concentrically positioned about one another and with respect to the central axis, the plurality of cylindrically shaped winding layers including an outermost layer. The method 1100 further includes a step 1115 of providing a double wall sound shield including concentric a first roving cylinder and a second roving cylinder, the first roving cylinder positioned against the outermost layer but detached from the coil by a first airgap between the outermost layer and the first roving cylinder to reduce a structure-borne transmission of an acoustic energy.

While a rectangular sound panel is described here a range of one or more other shapes of sound panels or other forms of sound panels are also contemplated by the present invention. For example, other types of sound panels or other sound panels of a full length along height or a full width along diameter or a fully coil-covering cylinder shape sound panel may be implemented based on one or more features presented above without deviating from the spirit of the present invention.

The techniques described herein can be particularly useful for modular sound absorbent panels that are sandwiched between two opposing mesh-grid fiberglass sheets. While particular embodiments are described in terms of the two-sheet structure, the techniques described herein are not limited to the two-sheet structure but can also be used with a multi-sheet structure.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An air core dry type power reactor comprising:
    upper and lower spider units each comprising a plurality of support arms extending radially outward from a central axis;
    a coil including a plurality of cylindrically shaped winding layers concentrically positioned about one another and with respect to the central axis, the plurality of cylindrically shaped winding layers including an outermost layer; and
    a double wall sound shield including concentric a first roving cylinder and a second roving cylinder, the first roving cylinder positioned against the outermost layer but detached from the coil by a first airgap between the outermost layer and the first roving cylinder to reduce a structure-borne transmission of an acoustic energy or attached by ductsticks to the coil,
    wherein the second roving cylinder is placed at a distance from the first roving cylinder to form an acoustic cavity between two double walls of the first roving cylinder and the second roving cylinder,
    wherein the double wall sound shield further includes a plurality of sound absorbent panels to attenuate resonances of the acoustic cavity between the two double walls of the first roving cylinder and the second roving cylinder, and
    wherein the plurality of sound absorbent panels comprises a layer of sound absorbing material and each of the plurality of sound absorbent panels is separated from the first roving cylinder by a second airgap.

2. The reactor of claim 1, wherein the plurality of sound absorbent panels includes a width dimension extending along a radial direction with respect to the central axis to provide a separation distance between the first roving cylinder and each of the plurality of sound absorbent panels such that the separation distance defines a cavity.

3. The reactor of claim 1, wherein each of the plurality of sound absorbent panels having two opposing major surfaces that form an absorbent layer of absorbent materials such that each of the two opposing major surfaces has a step-shape surface to increase an absorption surface and reduce impedance mismatch between air and the absorbent layer.

4. The reactor of claim 1, wherein the plurality of sound absorbent panels fills up a percentage of the space between concentric the first roving cylinder and the second roving cylinder such that the percentage of the space filled is defined based on a frequency range and a volume of the air core dry type power reactor.

5. The reactor of claim 1, wherein the plurality of sound absorbent panels is modular and standardized such that dimensions of the plurality of sound absorbent panels are sized regardless of dimensions of coils.

6. The reactor of claim 1, wherein the double wall sound shield is configured to increase a transmission loss such that less acoustic power will be transmitted to a receiving side by using double concentric walls of the first roving cylinder and the second roving cylinder.

7. The reactor of claim 1, wherein the double wall sound shield is configured to control propagation of sound generated in the reactor to attenuate noise generated within the reactor with a combination of a sound shield structure that enhances sound transmission loss (STL) using a concentric double cylinder structure and a sound attenuation panel structure decoupled from the concentric double cylinder structure by air gaps.

8. The reactor of claim 1, wherein the plurality of sound absorbent panels comprising installation means such that an installation labor hour saving associated with installation of the plurality of sound absorbent panels during the double wall sound shield installation is better than installing of common known sound panels.

9. The reactor of claim 1, wherein the plurality of sound absorbent panels including a given number of sound panel rows along an axis being defined based on a distance between the upper and lower spider units (DBS) of the coil.

10. The reactor of claim 1, wherein the double wall sound shield including double absorbent surface and the plurality of sound absorbent panels being modular sound panels.

11. A method of attenuating noise generated within an air-core reactor, the method comprising:
    providing upper and lower spider units each comprising a plurality of support arms extending radially outward from a central axis;
    providing a coil including a plurality of cylindrically shaped winding layers concentrically positioned about one another and with respect to the central axis, the plurality of cylindrically shaped winding layers including an outermost layer; and
    providing a double wall sound shield including concentric a first roving cylinder and a second roving cylinder, the first roving cylinder positioned against the outermost layer but detached from the coil by a first airgap between the outermost layer and the first roving cylinder to reduce a structure-borne transmission of an acoustic energy or attached by ductsticks to the coil,
    wherein the second roving cylinder is placed at a distance from the first roving cylinder to form an acoustic cavity between two double walls of the first roving cylinder and the second roving cylinder, wherein the double wall sound shield further includes a plurality of sound absorbent panels to attenuate resonances of the acoustic cavity between the two double walls of the first roving cylinder and the second roving cylinder, and wherein the plurality of sound absorbent panels comprises a layer of sound absorbing material and each of the plurality of sound absorbent panels is separated from the first roving cylinder by a second airgap.

12. The method of claim 11, wherein the plurality of sound absorbent panels includes a width dimension extending along a radial direction with respect to the central axis to provide a separation distance between the first roving cylinder and each of the plurality of sound absorbent panels such that the separation distance defines a cavity.

13. The method of claim 11, wherein each of the plurality of sound absorbent panels having two opposing major surfaces that form an absorbent layer of absorbent materials such that each of the two opposing major surfaces has a step-shape surface to increase an absorption surface and reduce impedance mismatch between air and the absorbent layer.

14. The method of claim 11, wherein the plurality of sound absorbent panels fills up a percentage of the space between concentric the first roving cylinder and the second roving cylinder such that the percentage of the space filled is defined based on a frequency range and a volume of the air core dry type power reactor.

15. The method of claim 11, wherein the plurality of sound absorbent panels is modular and standardized such that dimensions of the plurality of sound absorbent panels are sized regardless of dimensions of coils.

16. The method of claim 11, wherein the double wall sound shield is configured to increase a transmission loss such that less acoustic power will be transmitted to a receiving side by using double concentric walls of the first roving cylinder and the second roving cylinder.

17. The method of claim 11, wherein the double wall sound shield is configured to control propagation of sound generated in the reactor to attenuate noise generated within the reactor with a combination of a sound shield structure that enhances sound transmission loss (STL) using a concentric double cylinder structure and a sound attenuation panel structure decoupled from the concentric double cylinder structure by air gaps.

18. The method of claim 11, wherein the plurality of sound absorbent panels comprising installation means such that an installation labor hour saving associated with installation of the plurality of sound absorbent panels during the double wall sound shield installation is better than installing of common known sound panels.

19. The method of claim 11, wherein the plurality of sound absorbent panels including a given number of sound panel rows along an axis being defined based on DBS of the coil.

20. The method of claim 11, wherein the double wall sound shield including double absorbent surface and the plurality of sound absorbent panels being modular sound panels.

* * * * *